(12) United States Patent
Parrott et al.

(10) Patent No.: US 11,718,356 B2
(45) Date of Patent: Aug. 8, 2023

(54) MASTER LINK ANTI-OVER ROTATION PLUG

(71) Applicant: Caterpillar Inc., Peoria, IL (US)

(72) Inventors: Stan R. Parrott, Chillicothe, IL (US); William P. Shoemaker, Peoria, IL (US); Jason L. Sebright, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 690 days.

(21) Appl. No.: 16/801,777

(22) Filed: Feb. 26, 2020

(65) Prior Publication Data

US 2021/0261207 A1 Aug. 26, 2021

(51) Int. Cl.
*B62D 55/21* (2006.01)
*B62D 55/32* (2006.01)

(52) U.S. Cl.
CPC ............ *B62D 55/213* (2013.01); *B62D 55/32* (2013.01)

(58) Field of Classification Search
CPC .... B62D 55/213; B62D 55/205; B62D 55/21; B62D 55/32; B62D 55/215
See application file for complete search history.

(56) References Cited

U.S. PATENT DOCUMENTS

| 3,171,695 | A | * | 3/1965 | Schick | B62D 55/213 |
| | | | | | 305/202 |
| 3,179,475 | A | * | 4/1965 | Lambie | B62D 55/213 |
| | | | | | 305/202 |
| 4,159,857 | A | * | 7/1979 | Purcell | B62D 55/28 |
| | | | | | 305/195 |
| 4,262,973 | A | * | 4/1981 | Grilli | B62D 55/213 |
| | | | | | 403/294 |
| 4,332,425 | A | * | 6/1982 | Baylor | B62D 55/213 |
| | | | | | 305/202 |
| 6,386,651 | B1 | | 5/2002 | Caterpillar | |
| 6,412,267 | B2 | * | 7/2002 | Duse | B62D 55/213 |
| 9,199,678 | B2 | * | 12/2015 | Tsubaki | B62D 55/21 |
| 10,723,396 | B2 | * | 7/2020 | Parrott | B62D 55/213 |
| 2020/0298920 | A1 | * | 9/2020 | Akinlua | B62D 55/32 |

FOREIGN PATENT DOCUMENTS

EP 1834863 A1 9/2007

* cited by examiner

*Primary Examiner* — Jason R Bellinger

(57) ABSTRACT

A link assembly for a machine is disclosed herein. The link assembly includes a first master link portion, a full track link, and a plug. The full track link is coupled to the first master link portion. The plug is positioned within the full track link and adjacent to the first master link portion. The plug is positioned and shaped to prevent the rotational movement of the first master link portion.

17 Claims, 5 Drawing Sheets

MASTER LINK ANTI-OVER ROTATION PLUG

TECHNICAL FIELD

The present disclosure generally pertains to machines. More particularly this disclosure is directed toward a link assembly for a machine.

BACKGROUND

Track-type work machines typically have a sprocket, an idler, and a track link assembly. During use of the work machine the sprocket rotates and engages the track link assembly, thereby causing the track link assembly to rotate around a path defined by the sprocket and the idler. The rotation of the track link assembly causes the work machine to be propelled over the ground so as to perform various work functions.

Track link assemblies generally include a pair of parallel chains, with each parallel chain being made up of a series of entrained track links or a link assembly. Track link assemblies further include a series of bushings and track pins interposed between and connected to the parallel chains. The bushings and the entrained track links cooperate to form a number of track joints which allow the necessary movement of the bushings relative to the track links during use of the track link assembly, for example, when the track link assembly rotates about the sprocket and the idler.

At times, the link assembly is packaged and transported. Sometimes components of the link assembly, for example a master link portion, can be deformed and damaged during its handling and transportation.

U.S. Pat. No. 6,386,651 to Gerardin et. al. describes an insert arrangement that includes a ring member having a first sidewall, a second sidewall, a bore defined therethrough, a first seal groove defined in the first sidewall, and a second seal groove defined in the second sidewall. The insert arrangement can include a bushing having a passageway defined therethrough and a bushing end face. The bushing is positioned relative to the ring member so that the passageway is linearly aligned with the bore and the first seal groove is located in an opposing relationship with the bushing end face. The insert arrangement further includes a link having an aperture defined therein. The link is positioned relative to the ring member so that the ring member is positioned within the aperture.

The present disclosure is directed toward improvements in the art.

SUMMARY

A link assembly for a machine is disclosed herein. The link assembly includes a first master link portion and a full track link. The full track link coupled to the first master link portion. The full track link including a fastening aperture extending therethrough and located proximate to the first master link portion. The link assembly further including a plug positioned within and extending beyond the fastening aperture and adjacent to the first master link portion.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Furthermore, some of the features and surfaces have been left out or exaggerated for clarity and ease of explanation.

Figure 1:
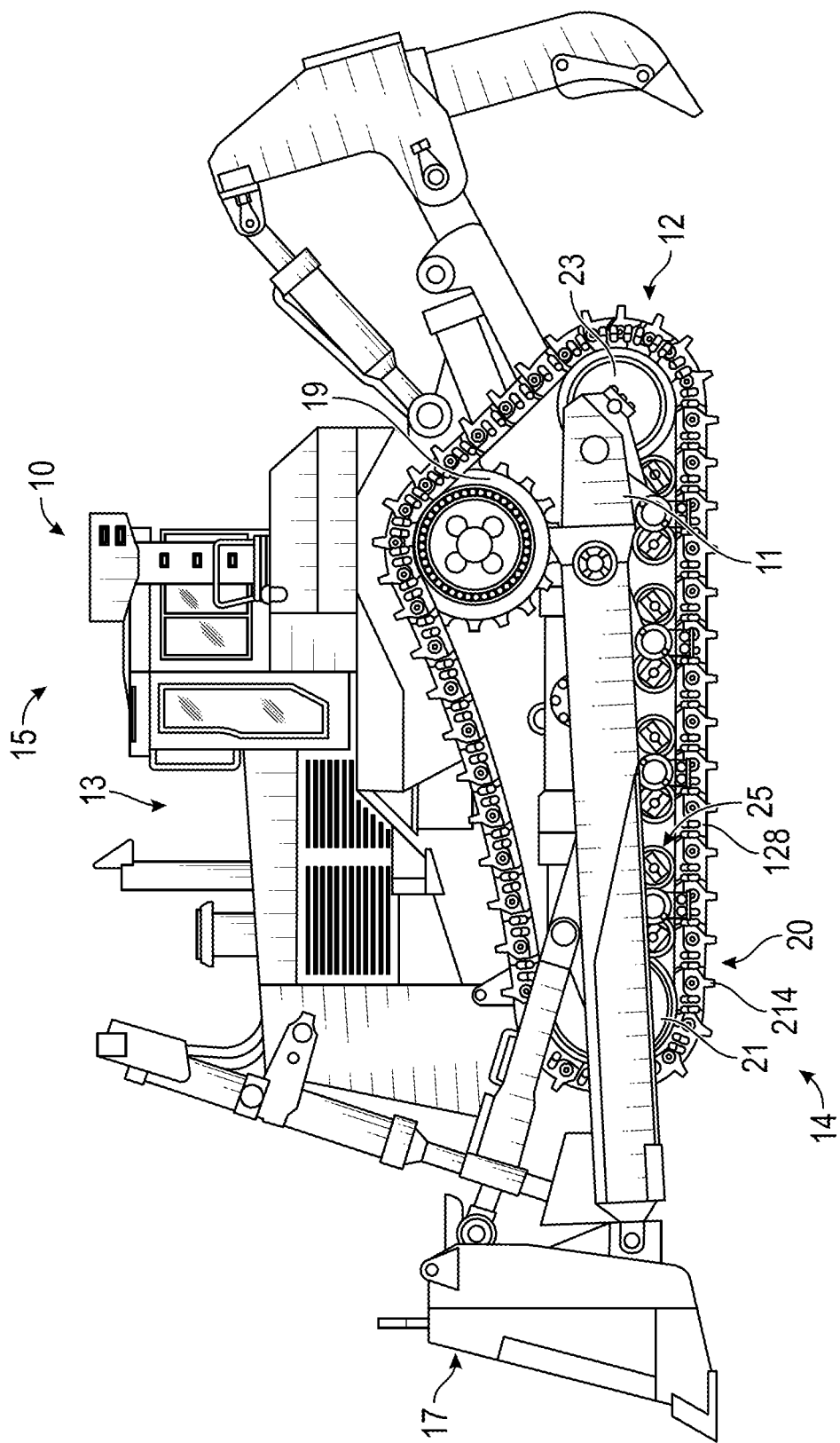
FIG. 1 is an illustration of a an exemplary machine with a link assembly.

FIG. 1 is an illustration of an exemplary machine with a link assembly. Where the drawing includes multiple instances of the same feature, for example roller assemblies 25, the reference number is only shown in connection with one instance of the feature to improve the clarity and readability of the drawing. This is also true in other drawings which include multiple instances of the same feature.

A machine 10 (sometimes referred to as a track vehicle) can include a frame 11, an engine assembly 13, and a cab assembly 15 all mounted on frame 11. Machine 10 can include a work implement 17, such as a blade, mechanically coupled to frame 11. The machine 10 can further include an undercarriage assembly, generally indicated as 12, mechanically coupled to frame 11.

Undercarriage assembly 12 can include a drive sprocket 19, a pair of idler wheels 21 and 23, and a number of roller assemblies 25 interposed between idler wheels 21 and 23. (Note that the present invention can also be utilized in oval systems.) Undercarriage assembly 12 can include track assemblies 14. The track assemblies 14 can include a number of link assemblies 114 with track shoes 214 attached to link assemblies 114. During use of the machine 10, the drive sprocket 19 rotates and engages the track assemblies 14, thereby causing the track assemblies 14 to rotate around a path defined by the drive sprocket 19 and the idler wheels 21 and 23. The rotation of the track assemblies 14 causes the machine 10 to be propelled over the ground so as to perform various work functions.

Figure 2:
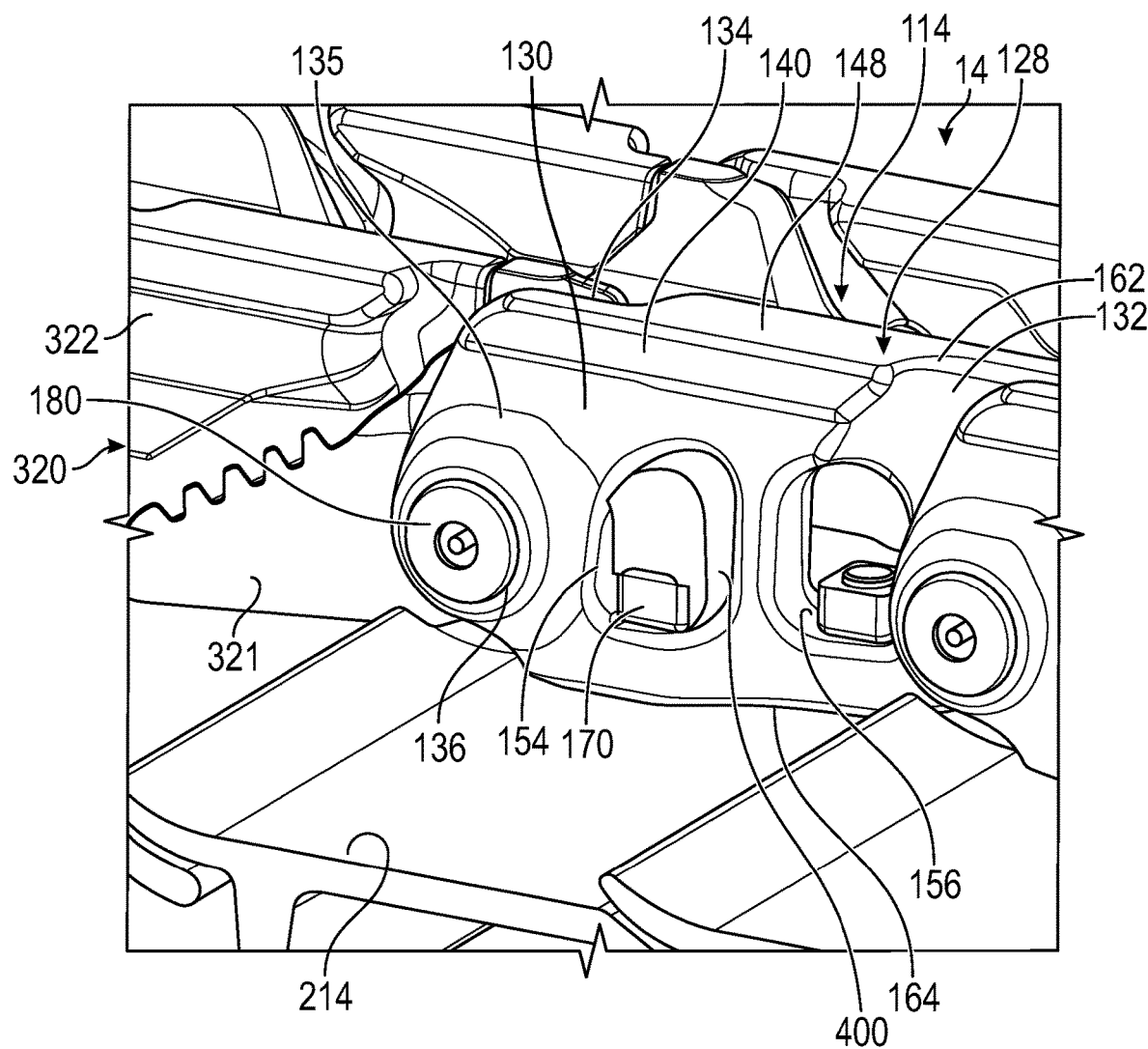
FIG. 2 is a detailed perspective view of the track assembly from FIG. 1.

FIG. 2 is a detailed perspective view of an exemplary link assembly from FIG. 1. A link assembly 114 can include a plurality of full track links 128 and a master link 320.

The full track link 128 can include a body member 130. The body member 130 can include a first side 132, a second side 134, a first bearing aperture 136 extending there through, a first fastening aperture 154 (sometimes referred to as fastening aperture) defined therethrough, and a second fastening aperture 156 defined therethrough. In an example the full track link 128 may only include one fastening aperture, such as a strut-less link design. The first fastening aperture 154 can be located proximate to the master link 320.

The first side 132 of body member 130 can include a first upper edge 162 and a first lower edge 164.

The first fastening aperture 154 can be interposed between the first bearing aperture 136 and the second fastening aperture 156. Full track link 128 can also include bolt holes defined in body member 130. These bolt holes can be positioned within the first fastening aperture 154 and the second fastening aperture 156. The full track link 128 can include a first top extension member 140 extending outwardly from the first upper edge 162 of the first side 132 of the body member 130. The full track link 128 can include a bearing extension member 135 extending outwardly from first side 132 of body member 130. The first bearing aperture 136 can extend through the bearing extension member 135. The bearing extension member 135 can be spaced apart from the top extension member 140.

The body member 130 can have a rail surface 148 and a shoe surface 150. In an embodiment the first side 132 is off-set from a second side 134 so that first side 132 is not coplanar with the second side 134. Having sides 132 and 134 off-set gives clearance between adjacent full track links 128 when utilized in the track assembly 14. In an embodiment the first fastening aperture 154 is off-set from the second fastening aperture 156 so that the first fastening aperture 154 is not coplanar with the second fastening aperture 156.

The master link 320 can include a first master link portion 321 (sometimes referred to as a portion of the master link or master link portion) and a second master link portion 322. The first master link portion 321 can be positioned proximate to the first bearing aperture 136 of the full track link 128. The link assembly 114 can include a bearing 180. The bearing 180 can extend through the first bearing aperture 136. The bearing 180 can couple the first master link portion 321 to the full track link 128.

The track assembly 14 can include a fastener assembly 170, The fastener assembly 170 can be located within the first fastening aperture 154 and can extend through the full track link 128 via bolt holes. The fastening assembly 170 can couple the full track link 128 to the track shoe 214.

The link assembly 114 can include a plug 400 (sometimes referred to as an anti-rotation plug). The plug 400 can be positioned within and extend beyond the first fastening aperture 154. The plug can be made from a variety of materials. For example, the plug 400 can be made of a polymer material such as plastic or rubber.

Figure 3:
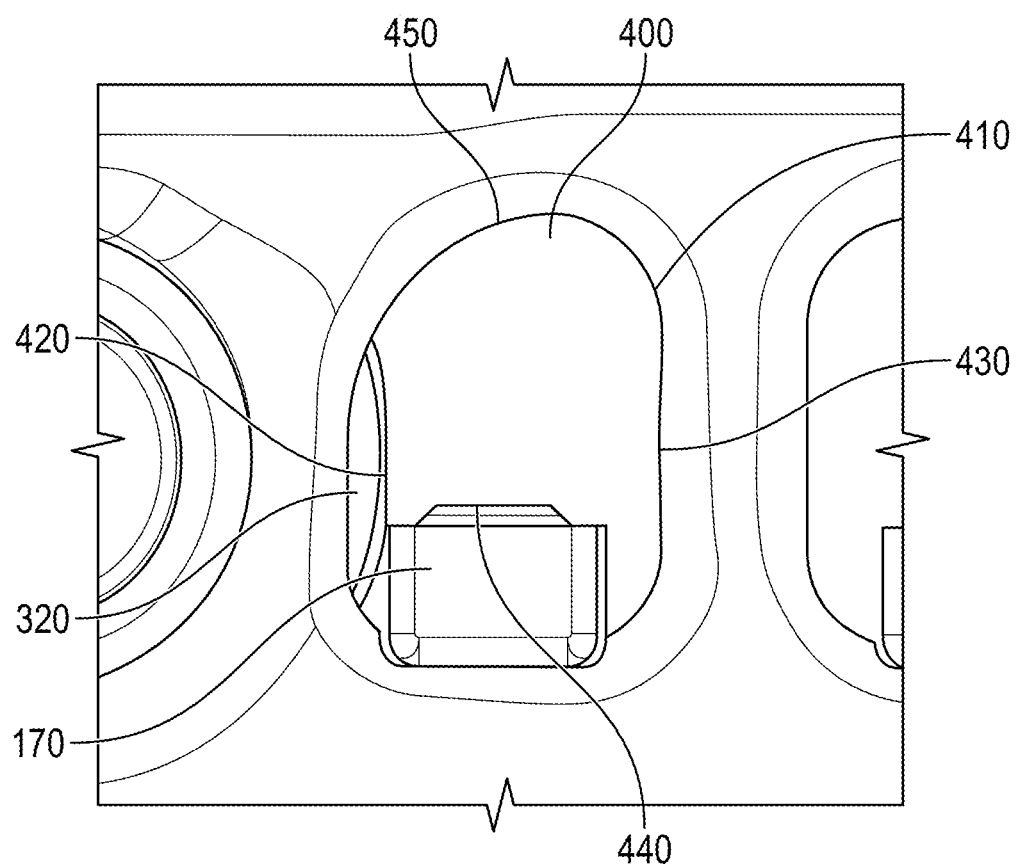
FIG. 3 is a side view of a portion of the full track link and plug from FIG. 2.

FIG. 3 is a side view of the full track link and plug from FIG. 2. The plug 400 can have an outer surface 410, a first side 420, a second side 430, a bottom side 440, and a top side 450. The first side 420 can be located opposite from the second side 430. The bottom side 440 can be located opposite the top side 450. The first side 420 can extend between the top side 450 and the bottom side 440. The second side 430 can extend between the top side 450 and the bottom side 440.

The outer surface 410 can contact the first master link portion 321 at the first side 420. The first side 420 can have a contoured portion to but a segment of the first master link portion 321. The first side 420 can be positioned adjacent to the first master link portion 321.

The outer surface 410 can contact the full track link 128 at the second side 430. The second side 430 can have a contoured portion to abut a segment of the first fastening aperture 154. The second side 430 can be positioned adjacent to the body member 130. The outer surface 410 can contact the first master link portion 321 and the body member 130 simultaneously.

The outer surface 410 can contact the fastening assembly 170 at the bottom side 440. The bottom side 440 can have a contoured portion to abut a portion of the fastening assembly 170. The bottom side 440 can be positioned adjacent to the fastening assembly 170.

The outer surface 410 can contact the full track link 128 at the top side 450. The top side 450 can have a contoured portion to abut a segment of the first fastening aperture 154. The top side 450 can be positioned adjacent to the body member 130.

Figure 4:
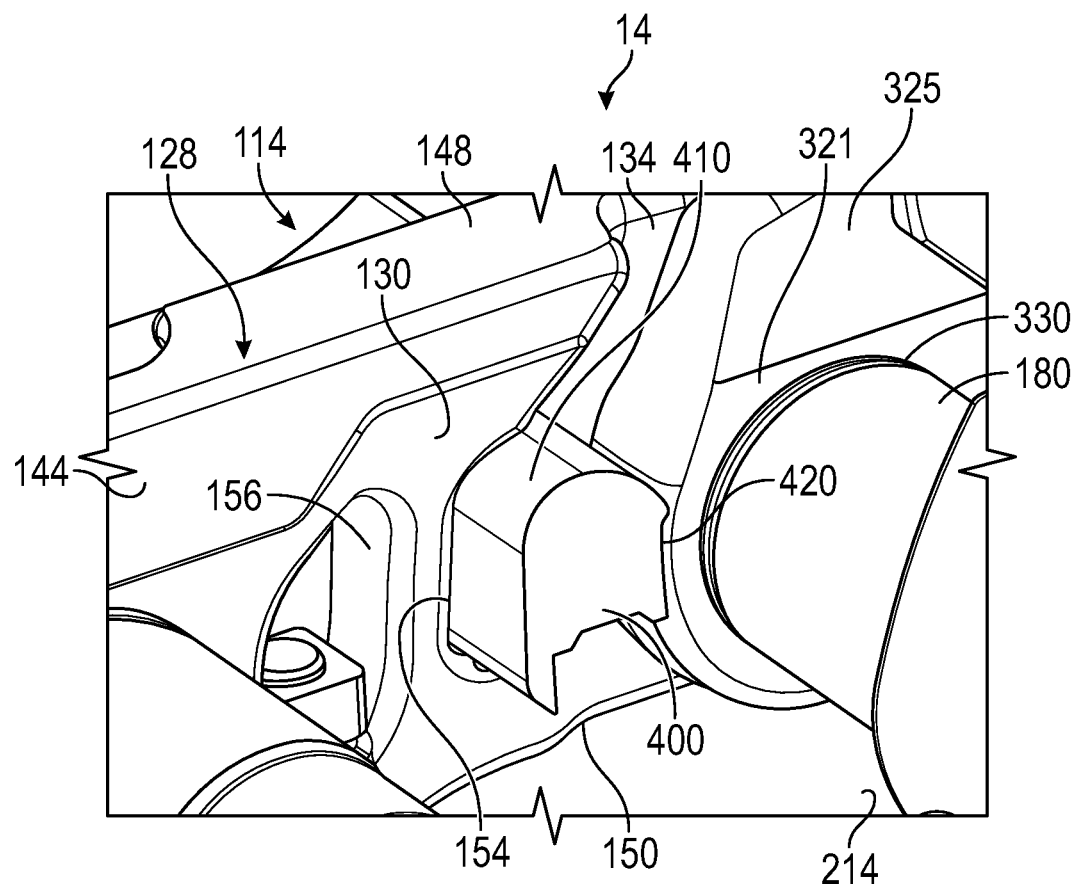
FIG. 4 is a perspective view of an opposite side of the link assembly from FIG. 2.

FIG. 4 is a perspective view of am opposite side of the link assembly from FIG. 2. The full track link 128 can include a second top extension member 144 extending outwardly from the second side 134 of the body member 130. The first master link portion 321 can include a master link bearing aperture 330 and a pad portion 325. The bearing 180 can extend through the first bearing aperture 136 (shown in FIG. 2) and the master link bearing aperture 330. The pad portion 325 can be located proximate to the bearing aperture 330. The pad portion 325 can extend away from the bearing aperture 330 as a protrusion.

The plug 400 can be positioned within the first fastening aperture 154. The plug 400 can extend from the first fastening aperture 154 to adjacent to the first master link portion 321.

Figure 5:
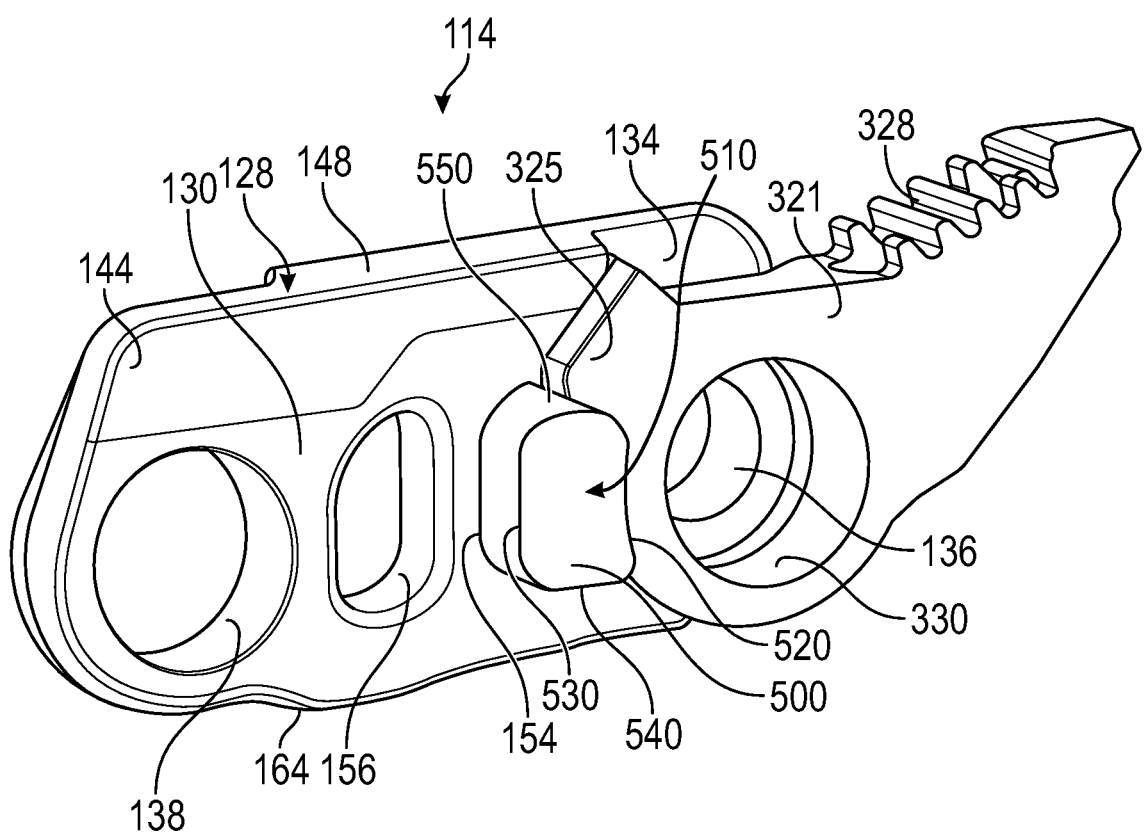
FIG. 5 is a perspective view of the full track link and master link portion from FIG. 2 and another exemplary embodiment of a plug.

FIG. 5 is a perspective view of the full track link 128 and master link portion 321 from FIG. 2 and another exemplary embodiment of a plug. A plug 500 can have an outer surface 510, a first side 520, a second side 530, a bottom side 540, and a top side 550. The first side 520 can be located opposite from the second side 530. The bottom side 540 can be located opposite from the top side 550. The first side 520 can extend between the top side 550 and the bottom side 540. The second side 530 can extend between the top side 550 and the bottom side 540.

The outer surface 510 can contact the first master link portion 321 at the first side 520. The first side 520 can have a contoured portion to abut a segment of the first master link portion 321. The first side 520 can be positioned adjacent to the first master link portion 321.

The outer surface 410 can contact the full track link 128 at the second side 530. The second side 530 can have a contoured portion to abut a segment of the first fastening aperture 154. The second side 530 can be positioned adjacent to the body member 130. The outer surface 510 can contact the first master link portion 321 and the body member 130 simultaneously.

The outer surface 510 can contact the full track link 128 at the bottom side 540. The bottom side 540 can have a contoured portion to abut a segment of the first fastening aperture 154. The bottom side 540 can be positioned adjacent to the body member 130.

The outer surface 510 can contact the full track link 128 at the top side 550. In an embodiment the top side 550 can contact the pad portion 325 and can prevent further rotation of the first master link portion 321. The top side 550 can have a contoured portion to abut a segment of the first fastening aperture 154 and the pad portion 325. The top side 550 can be positioned adjacent to the body member 130 and the pad portion 325.

INDUSTRIAL APPLICABILITY

The present disclosure generally applies to a link assembly 114 for a machine 10 such as a track vehicle. It is understood that the link assembly 114 may be used with any stationary or mobile machine known in the art. Such machines may be used in construction, farming, mining, power generation, and/or other like applications. Accordingly, such machines may include, for example, excavators, track-type tractors, wheel loaders, on-road vehicles, off-road vehicles, generator sets, motor graders, or other like machines.

The link assembly 114 may be coiled prior to transportation. During the packaging, transportation and uncoiling of a link assembly 114, the master link 320 on the inside of the coil can over-rotate and hit the adjacent full track link 128 which creates a non-conforming feature on the machined master link surface. This nonconformance will create a negative impact to the assembling of the mating master link. A "riser" or "bump" on the master link may not allow for flush mated and assembled master links.

The link assembly 114 can include a full track link 128 and a master link 320 disposed adjacent to the full track link 128. The full track link 128 can include a body member 130 with a plug 400, 500 positioned within the first fastening aperture 154. The plug 400, 500 can prevent rotation of the first master link portion 321. The plug 400, 500, can be positioned to prevent rotation of the first master link portion 321 by making contact with the pad portion 325. The plug 400, 500 may be made up of plastic or rubber. The plug 400, 500 can be configured to prevent the over rotation of the first master link portion 321 during the assembly, coiling, transportation, and uncoiling process and thus prevent nonconformance to a machined surface 328 of the first master link portion 321.

Although this disclosure has been shown and described with respect to detailed embodiments thereof, it will be understood by those skilled in the art that various changes in form and detail thereof may be made without departing from the spirit and scope of the claimed disclosure. Accordingly, the preceding detailed description is merely exemplary in nature and is not intended to limit the disclosure or the application and uses of the disclosure. In particular, the described embodiments are not limited to use in conjunction with a particular type of machine 10. For example, the described embodiments may be applied to machines employed in mining, construction, farming, and power generation applications, or any variant thereof. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

What is claimed is:

1. A link assembly for a machine, the link assembly comprising:
    a first master link portion;
    a full track link coupled to the first master link portion, the full track link including
        a fastening aperture extending therethrough and located proximate to the first master link portion; and
    a plug positioned within and extending beyond the fastening aperture and adjacent to the first master link portion.

2. The link assembly of claim 1, wherein the first master link portion further includes a master link bearing aperture; wherein the full track link further includes a bearing aperture; and wherein the link assembly further comprises a bearing extending through the master link bearing aperture and the bearing aperture of the full track link, the bearing coupling the first master link portion to the full track link.

3. The link assembly of claim 1, wherein the plug cannot substantially rotate within the fastening aperture.

4. The link assembly of claim 3, wherein the plug has an outer surface that contacts the first master link portion and the full track link simultaneously.

5. The link assembly of claim 1, wherein the plug further comprises
    a first side;
    a second side opposite the first side;
    a bottom side extending from the first side to the second side; and
    a top side opposite the bottom side and extending from the first side to the second side.

6. The plug of claim 5, wherein a portion of the first side contacts the first master link portion, and wherein a portion of the top side and a portion of the second side contact the full track link.

7. The plug of claim 5, wherein the first side is positioned adjacent to the first master link portion, and wherein the top side and second side are positioned adjacent to the full track link.

8. A track assembly for a machine, the track assembly comprising:
    a first master link portion;
    a plurality of full track links, each of the plurality of full track links coupled to at least one of the plurality of full track links, at least one of the plurality of full track links coupled to the first master link portion, each of the plurality of full track links including
        a fastening aperture; and
    a plug positioned adjacent to the first master link portion, the plug positioned within and extending beyond the fastening aperture of at least one of the plurality of full track links coupled to the first master link portion.

9. The track assembly of claim 8, wherein the plug further comprises
    a first side;
    a second side opposite the first side;
    a bottom side extending from the first side to the second side; and
    a top side opposite the bottom side and extending from the first side to the second side.

10. The track assembly of claim 9, wherein the track assembly further comprises a plurality of track shoes; and a plurality of fastening assemblies coupling the plurality of full track links to the plurality of track shoes.

11. The track assembly of claim 10, wherein the plug is positioned in contact with the first master link portion, at least one of the plurality of fastening assemblies, and the fastening aperture of at least one of the plurality of full track links coupled to the first master link portion.

12. The track assembly of claim 10, wherein a portion of the first side contacts the first master link portion, wherein the bottom side is positioned adjacent to the fastening assembly, and wherein a portion of the top side and a portion of the second side contacts the full track link.

13. The track assembly of claim 9, wherein the first side is positioned adjacent to the first master link portion, and wherein the top side and second side are positioned adjacent to the full track link.

14. An anti-rotation plug for a machine with a link assembly, the link assembly including a master link portion and a full track link including a fastening aperture extending therethrough, the anti-rotation plug comprising:
   a first side having a contoured portion to abut the first master link portion; and
   a second side opposite the first side and having a contoured portion to abut the full track link.

15. The anti-rotation plug of claim 14, wherein the anti-rotation plug further comprises:
   a bottom side extending from the first side to the second side; and
   a top side opposite the bottom side and extending from the first side to the second side, the top side having a contoured portion to contact the full track link.

16. The anti-rotation plug of claim 15, wherein the top side of the anti-rotation plug is shaped to limit rotation of the master link portion.

17. The anti-rotation plug of claim 14, wherein the anti-rotation plug is made from a polymer material.

\* \* \* \* \*